United States Patent
Takichi et al.

(10) Patent No.: US 11,996,713 B2
(45) Date of Patent: May 28, 2024

(54) CHARGING APPARATUS AND RECEPTACLE CONTROL METHOD

(71) Applicant: PANASONIC INTELLECTUAL PROPERTY MANAGEMENT CO., LTD., Osaka (JP)

(72) Inventors: Hiroshi Takichi, Kanagawa (JP); Takashi Kuwabara, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 449 days.

(21) Appl. No.: 17/528,826

(22) Filed: Nov. 17, 2021

(65) Prior Publication Data

US 2022/0077697 A1    Mar. 10, 2022

Related U.S. Application Data

(63) Continuation of application No. PCT/JP2020/012143, filed on Mar. 18, 2020.

(30) Foreign Application Priority Data

Jun. 27, 2019   (JP) ................................. 2019-120433

(51) Int. Cl.
*H02J 7/00*     (2006.01)
*G06F 1/26*     (2006.01)
*G06F 3/14*     (2006.01)

(52) U.S. Cl.
CPC .............. *H02J 7/0029* (2013.01); *G06F 1/26* (2013.01); *H02J 7/0042* (2013.01); *H02J 7/0047* (2013.01); *G06F 3/14* (2013.01)

(58) Field of Classification Search
CPC ...... H02J 7/0029; H02J 7/0042; H02J 7/0047; G06F 3/14
See application file for complete search history.

(56) References Cited

U.S. PATENT DOCUMENTS

2017/0110835 A1   4/2017   Hasegawa et al.
2018/0019585 A1*   1/2018   Koga ...................... H02H 3/087

FOREIGN PATENT DOCUMENTS

JP   2015-023699    2/2015
JP   2017-079048    4/2017
(Continued)

OTHER PUBLICATIONS

International Search Report (ISR) from International Searching Authority (Japan Patent Office) in International Pat. Appl. No. PCT/JP2020/012143, dated Apr. 28, 2020, together with an English language translation.

(Continued)

*Primary Examiner* — Robert Grant
(74) *Attorney, Agent, or Firm* — Greenblum & Bernstein, P.L.C.

(57) ABSTRACT

A charging apparatus includes: a receptacle including terminals; a power supply configured to supply a voltage or a current to a first terminal; a first voltage detector configured to detect a voltage of the first terminal; a second voltage detector configured to detect a voltage of a second terminal at one place, two places or three places away from the first terminal; and a processor. The processor is configured to determine whether the voltage of the second terminal is equal to or higher than a second threshold value during a period in which the voltage of the first terminal is equal to or higher than a first threshold value, and stop supply of the voltage or the current from the power supply to the first terminal in a case in which the voltage of the second terminal is equal to or higher than the second threshold value.

20 Claims, 8 Drawing Sheets

(56) References Cited

FOREIGN PATENT DOCUMENTS

JP 2017-201862 11/2017
JP 2018-011442 1/2018

OTHER PUBLICATIONS

Written Opinion (WO) from International Searching Authority (Japan Patent Office) in International Pat. Appl. No. PCT/JP2020/012143, dated Apr. 28, 2020, together with an English language translation.

* cited by examiner

CHARGING APPARATUS AND RECEPTACLE CONTROL METHOD

CROSS-REFERENCE TO RELATED APPLICATIONS

This application is a continuation of PCT International Patent Application No. PCT/JP2020/012143 filed on Mar. 18, 2020, which claims the benefit of priority of Japanese Patent Application No. 2019-120433 filed on Jun. 27, 2019, the entire contents of which are incorporated herein by reference.

FIELD

The present disclosure relates to a charging apparatus that performs charging by using a receptacle, and a receptacle control method.

BACKGROUND

In related art, it is known that ion migration occurs due to liquid adhering to a terminal configured to connect an electronic device. Ion migration is a phenomenon during which a metal component moves through a surface or inside of a non-metal medium due to an influence of an electric field, and may corrode a terminal in a short period of time. JP-A-2017-079048 describes a terminal device having a configuration in which occurrence of ion migration is taken into account.

SUMMARY

The terminal device is charged by, for example, a charging apparatus, and ion migration may also occur in a receptacle of the charging apparatus that is connected to the terminal device. There is also room for improvement in prevention of ion migration in the charging apparatus.

The present disclosure provides a charging apparatus and a receptacle control method capable of preventing progress of ion migration in a receptacle of the charging apparatus.

In an aspect of the present disclosure, there is provided a charging apparatus including: a receptacle including a plurality of terminals; a power supply configured to supply a voltage or a current to a first terminal included in the plurality of terminals; a first voltage detector configured to detect a voltage of the first terminal; a second voltage detector configured to detect a voltage of a second terminal included in the plurality of terminals, the second terminal being a terminal at one place, two places or three places away from the first terminal; and a processor configured to determine whether the voltage of the second terminal is equal to or higher than a second threshold value during a period in which the voltage of the first terminal is equal to or higher than a first threshold value, and stop supply of the voltage or the current from the power supply to the first terminal in a case in which the voltage of the second terminal is equal to or higher than the second threshold value.

In an aspect of the present disclosure, there is provided a receptacle control method for controlling a receptacle provided in a charging apparatus and including a plurality of terminals, the receptacle control method including: supplying a voltage or a current to a first terminal included in the plurality of terminals; detecting a voltage of the first terminal; detecting a voltage of a second terminal included in the plurality of terminals, the second terminal being a terminal at one place, two places or three places away from the first terminal; and determining whether the voltage of the second terminal is equal to or higher than a second threshold value during a period in which the voltage of the first terminal is equal to or higher than a first threshold value, and stopping the supply of the voltage or the current to the first terminal in a case in which the voltage of the second terminal is equal to or higher than the second threshold value.

According to the present disclosure, progress of ion migration in the receptacle of the charging apparatus can be prevented.

DETAILED DESCRIPTION

Hereinafter, a charger that is an embodiment specifically disclosing the charging apparatus and the receptacle control method according to the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Introduction to Embodiment of Present Disclosure

The terminal device of JP-A-2017-079048 includes a receptacle, and does not output any pulse from a CC terminal when no plug is connected to the receptacle. The terminal device outputs a pulse for detecting connection of the plug to a first GND terminal, which is a terminal different from the CC terminal, at a voltage lower than that of the CC terminal. A controller detects the connection of the plug and adhesion of liquid based on a voltage of the first GND terminal.

However, it is preferable that the GND terminal is originally stable at a ground potential. When the voltage of the GND terminal is intentionally changed for use, it is necessary to change the GND terminal from the ground potential. Therefore, a transistor for changing the GND terminal from a set potential is added to the receptacle. Therefore, the transistor, which is an active element, is added such that the number of components is increased, and thus a cost is increased. This also applies to charging apparatuses including similar terminals.

In the following embodiment, a charging apparatus and a receptacle control method capable of preventing progress of ion migration in a receptacle of the charging apparatus will be described.

Embodiment

Figure 1:
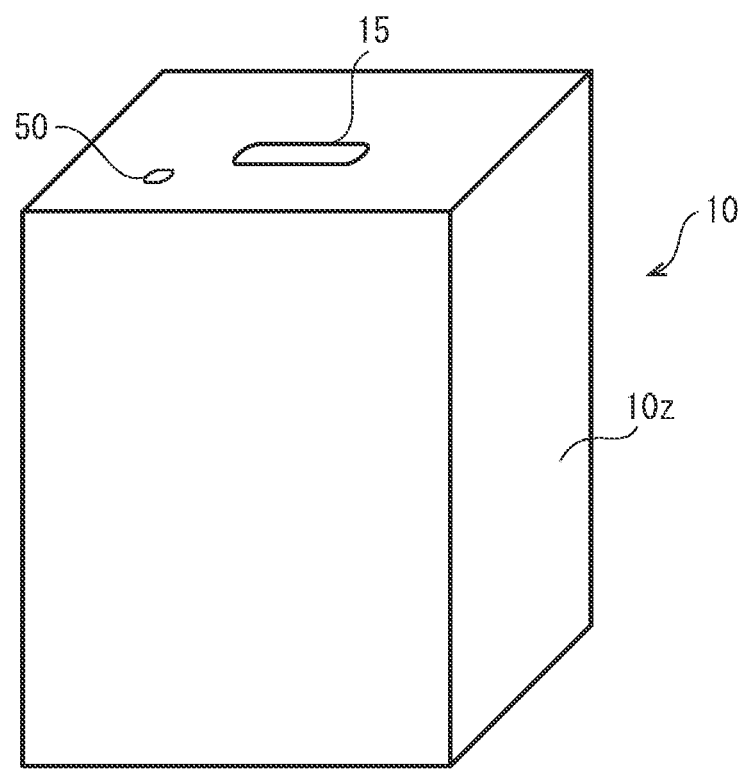
FIG. 1 is a perspective view showing an appearance of a charger according to an embodiment.

FIG. 1 is a perspective view showing an appearance of a charger 10 according to an embodiment. The charger 10 is mounted on a vehicle, for example, and is arranged in a center console or the like in a vehicle interior. For example, the charger 10 is powered by an in-vehicle battery, and is activated by energization from the in-vehicle battery when an ignition key is switched to ACC ON (that is, accessory power supply ON). The charger 10 includes, for example, a receptacle of a universal serial bus (USB) Type-C connector (hereinafter, referred to as the USB receptacle 15). When a USB plug of an external device is directly connected to the USB receptacle 15, or when the external device is connected via a USB cable, the charger 10 charges the external device. The external device is, for example, a mobile terminal.

The charger 10 includes, for example, a box-shaped housing 10z. The USB receptacle 15 may be arranged on an upper surface of the housing 10z. When the charger 10 is arranged in the center console, the upper surface of the housing 10z faces upward, so that the USB receptacle 15 is in a state where a falling foreign substance is easily received. The falling foreign substance is, for example, liquid or dust. Here, an example in which the charger 10 includes one USB receptacle 15 and charges a device connected to the one USB receptacle 15 will be described. However, the charger 10 may include a plurality of USB receptacles 15 and charge devices connected to the plurality of USB receptacles 15 simultaneously or sequentially. A display 50 may also be arranged on the upper surface of the housing 10z.

Figure 2:
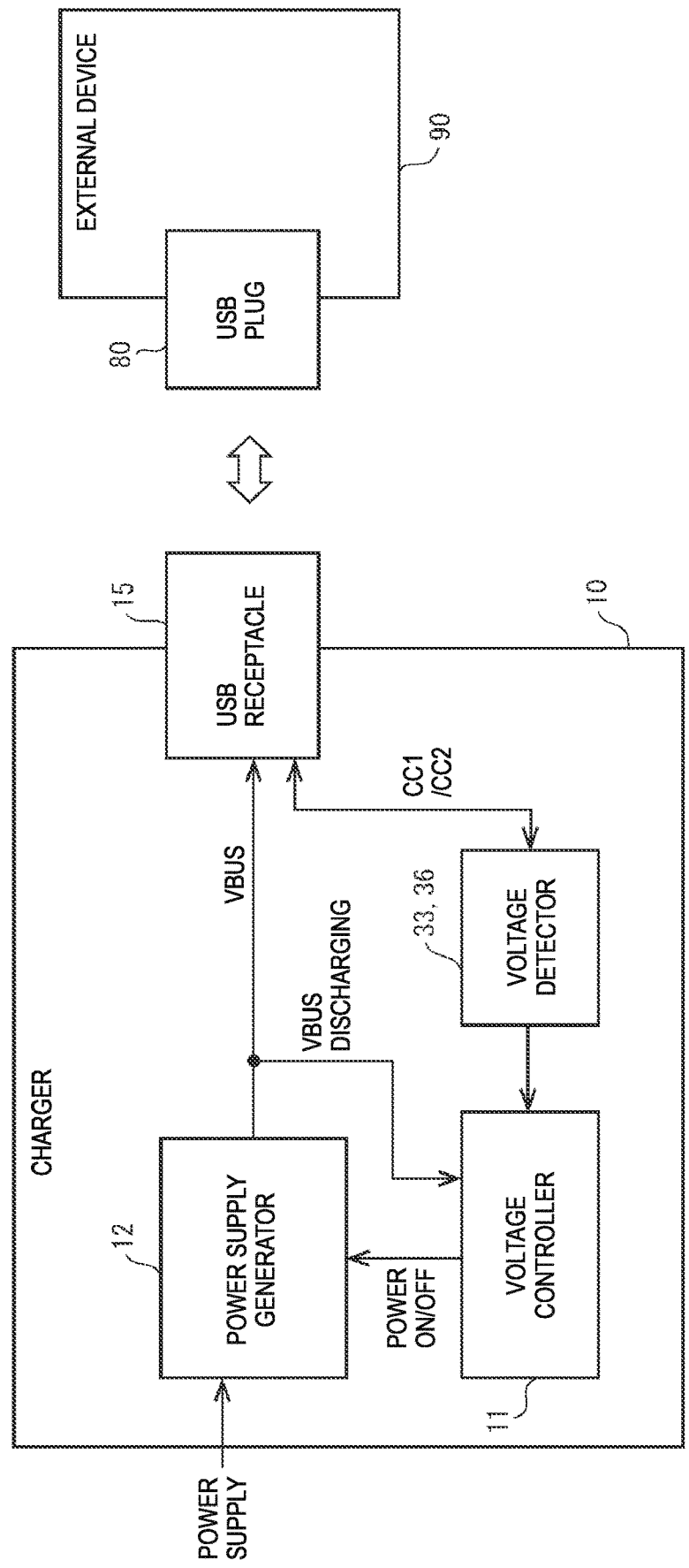
FIG. 2 shows a configuration of a portion related to charging control of the charger.

FIG. 2 shows a configuration of a portion related to charging control of the charger 10. The charger 10 includes a voltage controller 11, a power supply generator 12, a voltage detector 36, a voltage detector 33, and the USB receptacle 15. A USB plug 80 of an external device 90 is connected to the USB receptacle 15. Although the voltage detector 36 and the voltage detector 33 are shown as examples of voltage detectors, the number of voltage detectors is not limited thereto, and may be one or three or more.

The power supply generator 12 is connected to the USB receptacle 15 via a VBUS line. The power supply generator 12 includes a DC-DC converter that performs DC voltage conversion, that is, DC-DC conversion. The power supply generator 12 converts a battery voltage of the in-vehicle battery into a charging voltage suitable for the external device 90 connected to the USB receptacle 15. In the case of a passenger car, the battery voltage may be, for example, 12V or another voltage. The charging voltage is, for example, 5V, and may also be another voltage. The charging voltage may also be, for example, 9V or 12V. Output of the DC-DC converter is input to the USB receptacle 15 via the VBUS line. The power supply generator 12 may also include a switching element that opens and closes connection between the output of the DC-DC converter and the VBUS line. In this case, the power supply generator 12 drives the switching element in response to a power-on or power-off instruction from the voltage controller 11. As a result, the power supply generator 12 opens and closes the output of the DC-DC converter connected to the VBUS line of the USB receptacle 15. The power supply generator 12 turns on the switching element in response to the power-on instruction from the voltage controller 11, and turns off the switching element in response to the power-off instruction. A field effect transistor (MOSFET: metal-oxide semiconductor field-effect transistor) or the like may be used as the switching element.

Based on voltages of a CC1 terminal (see FIG. 3) and a CC2 terminal (see FIG. 3) of the USB receptacle 15 detected by the voltage detectors 36 and 33, respectively, the voltage controller 11 instructs the power supply generator 12 whether to supply the charging voltage to the VBUS line, that is, power-on or power-off. The voltage controller 11 may be implemented as a part of a function of a processor 30, for example.

The CC1 terminal and the CC2 terminal are also collectively referred to as the "CC terminal". The CC terminal refers to the CC1 terminal and the CC2 terminal, and may also refer to at least one of the CC1 terminal and the CC2 terminal. In the drawings, the CC terminal is simply referred to as "CC1", "CC2", and the like while characters "terminal" thereof are omitted. The same also applies to the other terminals of the USB receptacle 15.

The voltage detectors 36 and 33 detect a voltage of the CC1 terminal and a voltage of the CC2 terminal of the USB receptacle 15, respectively, and output the voltages to the voltage controller 11. The voltage detectors 36 and 33 each include, for example, an A/D converter, detect digital voltage values of the CC1 terminal and the CC2 terminal converted by the A/D converter as the voltages, and outputs the voltages to the voltage controller 11. The voltage of the CC1 terminal and the voltage of the CC2 terminal are different between a case where the USB plug 80 of the external device 90 is connected to the USB receptacle 15 and a case where the USB plug 80 is not connected thereto. Instead of the A/D converter, the voltage detectors 36 and 33 may also include, for example, a comparator.

The USB plug 80 may be mounted on a housing of the external device 90 directly or in a reciprocable manner, or may be provided at an end portion of a USB cable connected to the external device 90. Examples of the external device include a mobile terminal and a personal computer (PC).

Figure 3:
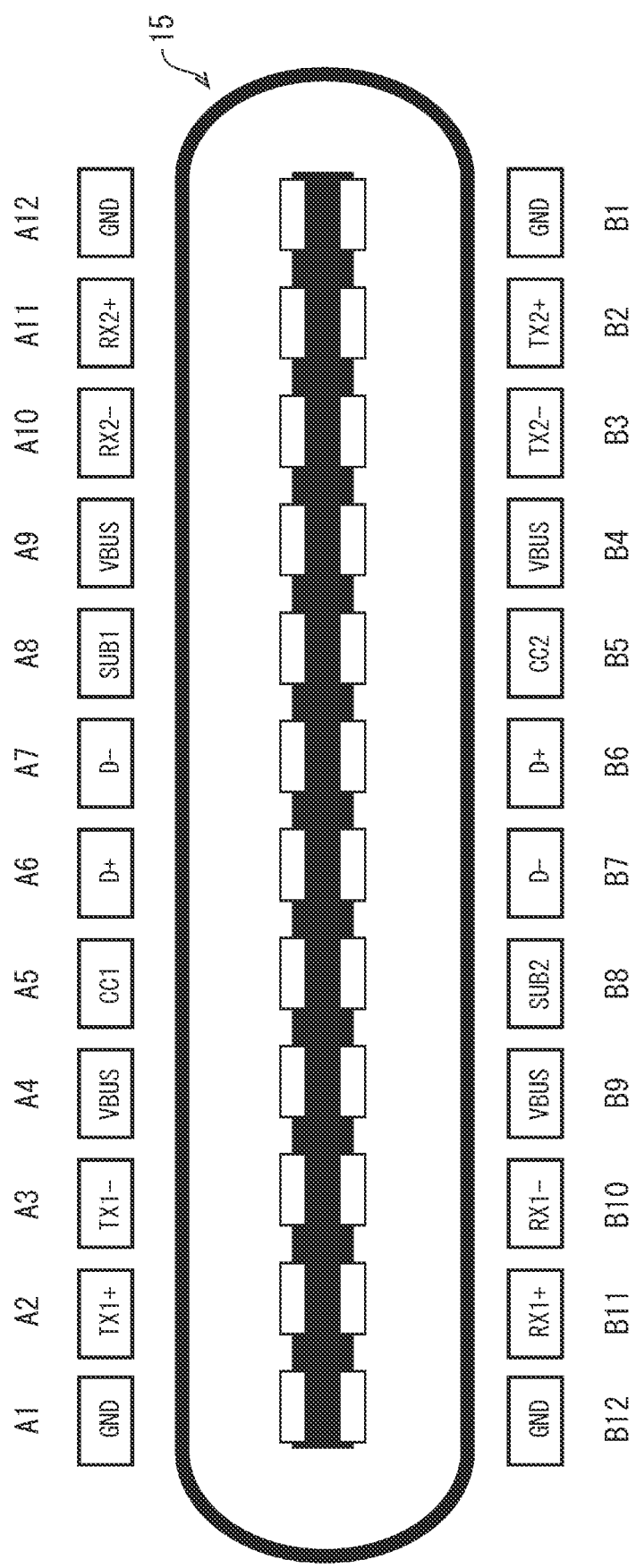
FIG. 3 shows a terminal arrangement of a USB receptacle.

FIG. 3 shows a terminal arrangement of the USB receptacle 15. The USB receptacle 15 is a receptacle of a USB Type-C connector. USB Type-C enables high-speed communication at a communication speed of 10 Gbps. In addition, a power delivery (PD) function in USB Type-C can supply power having a charging voltage of up to 20V and a charging power of up to 100 W. In addition, the USB Type-C connector is compatible with a USB standard connector other than the USB Type-C connector depending on a control mode called an alternate mode.

The USB receptacle 15, which is the receptacle of the USB Type-C connector, has a 24-pin terminal arrangement in which pin terminals A1 to A12 and pin terminals B1 to B12 are arranged in two rows, upper and lower, respectively. The upper row pin terminals and the lower row pin terminals are arranged in point symmetry. The pin terminals A1 to A12 are a GND terminal for grounding, a TX1+ terminal that is a positive electrode terminal corresponding to SuperSpeed, a TX1− terminal that is a negative electrode terminal corresponding to SuperSpeed, a VBUS terminal for bus power supply, a CC1 terminal for connection configuration, a D+ terminal (also referred to as a Dp1 terminal) that is a positive electrode terminal not corresponding to SuperSpeed, a D− terminal (also referred to as a Dn1 terminal) that is a negative electrode terminal not corresponding to Super-Speed, an SBU1 terminal for sideband, a VBUS terminal for bus power supply, an RX2− terminal that is a negative electrode terminal corresponding to SuperSpeed, an RX2+ terminal that is a positive electrode terminal corresponding to SuperSpeed, and a GND terminal for grounding, respectively.

The pin terminals B1 to B12 are a GND terminal for grounding, a TX2+ terminal that is a positive electrode terminal corresponding to SuperSpeed, a TX2− terminal that is a negative electrode terminal corresponding to Super-Speed, a VBUS terminal for bus power supply, a CC2 terminal for connection configuration, a D+ terminal (also referred to as a Dp2 terminal) that is a positive electrode terminal not corresponding to SuperSpeed, a D− terminal (also referred to as a Dn2 terminal) that is a negative electrode terminal not corresponding to SuperSpeed, an SBU2 terminal for sideband, a VBUS terminal for bus power supply, an RX1− terminal that is a negative electrode terminal corresponding to SuperSpeed, an RX1+ terminal that is a positive electrode terminal corresponding to SuperSpeed, and a GND terminal for grounding, respectively.

The CC terminal is used for PD communication. The PD communication is communication related to negotiation. When the USB plug 80 of the external device 90 is connected to the USB receptacle 15 of the charger 10, for example, the charger 10 is on a power supply side, that is, a downstream-facing port (DFP) side, and the external device is on a power reception side, that is, an upstream-facing port (UFP) side. The UFP side CC terminal and the DFP side CC terminal are connected to establish a communication line CC.

When the USB plug 80 is not connected to the USB receptacle 15 of the charger 10, a voltage of the CC terminal of the USB receptacle 15 is, for example, 5V due to a pull-up resistor. A voltage of a CC terminal of the USB plug 80 is, for example, 0V due to a pull-down resistor.

When the USB plug 80 is connected to the USB receptacle 15 of the charger 10, the CC terminal of the USB receptacle 15 is connected to the CC terminal of the USB plug 80 via the pull-up resistor of the USB receptacle 15 and the pull-down resistor of the USB plug 80. The voltage of the CC terminal of the USB receptacle 15 becomes, for example, 1.5V, which is lower than 5.5V, due to resistance voltage division of the pull-up resistor and the pull-down resistor.

The communication line CC is used for communication related to negotiation of a PD protocol. When the charger 10 detects that the USB plug 80 of the external device 90 is connected to the USB receptacle 15, a charging voltage is supplied to the VBUS line so as to charge the external device 90 via the VBUS line. The charging voltage is, for example, 5V.

As shown in FIG. 3, the VBUS terminal and the D+ terminal are arranged at one place away from the CC1 terminal. The VBUS terminal and the D+ terminal are arranged at one place away from the CC2 terminal. The terminals at one place away from the CC1 terminal and the CC2 terminal are also referred to as the "adjacent terminal" in the present embodiment. The adjacent terminal refers to at least one of the four terminals.

Between the CC1 terminal and terminals at three places away from to the CC1 terminal, the D− terminal and the TX1− terminal are located at two places away from the CC1 terminal, and the SBU 1 terminal and the TX1+ terminal are located at three places away from to the CC1 terminal, in addition to the adjacent terminal that is at one place from the CC1 terminal. Between the CC2 terminal and terminals at three places away from the CC2 terminal, the TX2− terminal and the D− terminal are located at two places away from the CC2 terminal, and the TX2+ terminal and the SBU 2 terminal are located at three places away from to the CC2 terminal, in addition to the adjacent terminal that is at one place away from the CC2 terminal. The terminals between the CC terminal and the terminals at three places away from the CC terminal are also referred to as the "peripheral terminal" in the present embodiment. The peripheral terminal refers to at least corresponding one of the twelve terminals.

In the USB receptacle 15, terminals having the same name are electrically connected to each other. For example, the four VBUS terminals are electrically connected inside the USB receptacle 15. The two D+ terminals are electrically connected inside the USB receptacle 15. The two D− terminals are electrically connected inside the USB receptacle 15. Therefore, when an increase or decrease in voltage is detected in one terminal having the same name due to, for example, presence of a foreign substance, the increase or decrease in voltage, which will be described later, is also detected in the other terminals having the same name.

Figure 4:
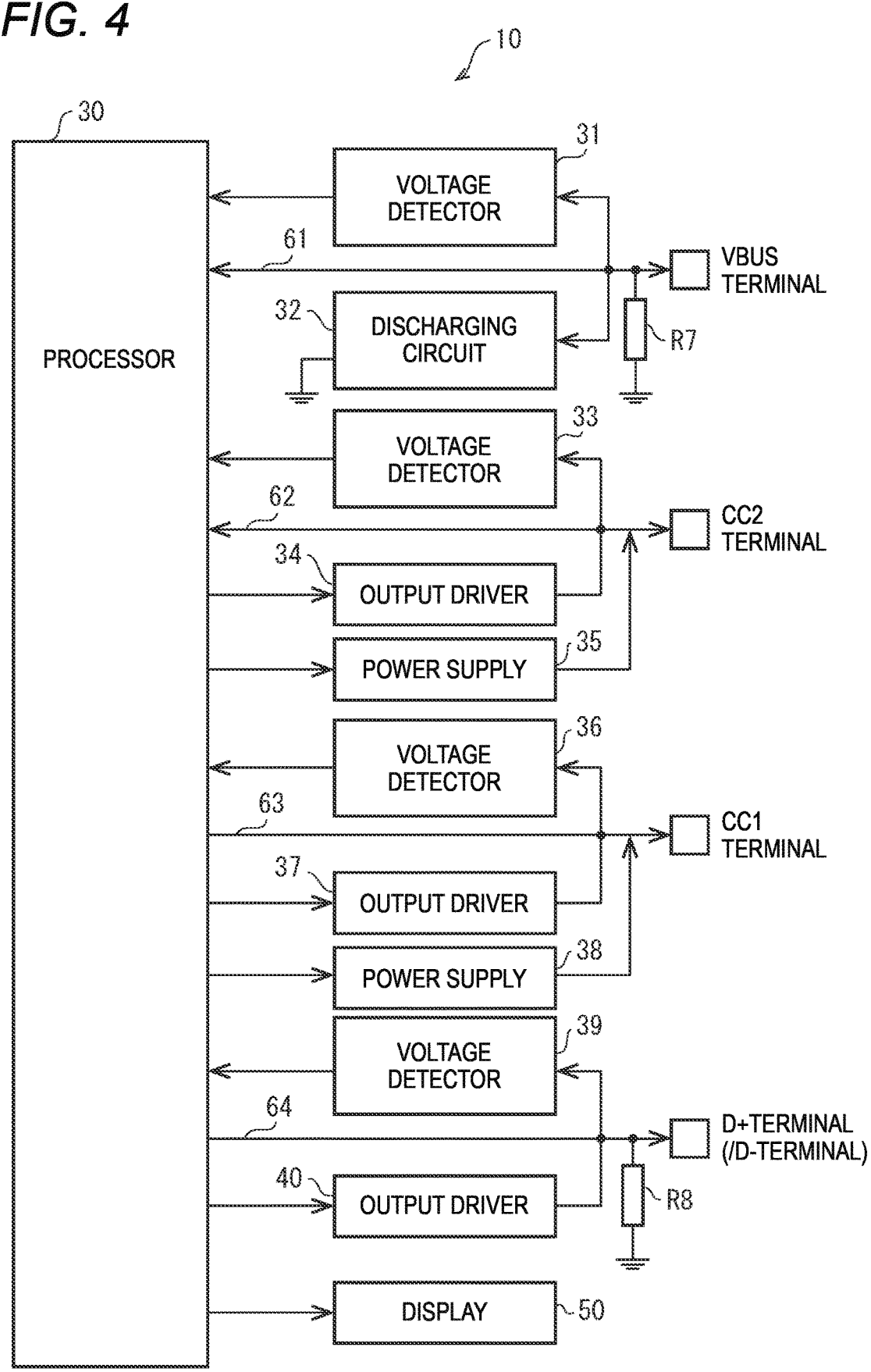
FIG. 4 shows a configuration of a portion related to foreign substance detection of the charger.

FIG. 4 shows a configuration of a portion related to foreign substance detection of the charger 10. In FIG. 4, it is assumed that a conductive foreign substance (hereinafter, simply referred to as the "foreign substance") is adhered to the CC terminal (here, the CC1 terminal and the CC2 terminal) and the adjacent terminal (here, the VBUS terminal and the D+ terminal) adjacent to the CC terminal. The foreign substance may be, for example, a water droplet, dust, dirt, or other conductive materials. Since a voltage is applied to the CC terminal, when the foreign substance is adhered to the CC terminal, ion migration may occur in a short time, and the CC terminal, the VBUS terminal, and the D+ terminal may be corroded. It should be noted that the voltage is applied to the CC terminal even when the USB plug 80 is not connected.

For example, in the USB receptacle 15, metal is moved due to application of the voltage, and corrosion may occur in about one hour depending on ambient temperature. In the present embodiment, a water droplet is mainly exemplified as the foreign substance. The water droplet may be dew condensation generated in a vehicle, drink dropped by an occupant of the vehicle by mistake, or the like.

The charger 10 includes the processor 30, a voltage detector 31, the voltage detector 33, the voltage detector 36, a voltage detector 39, a discharging circuit 32, a power supply 35, a power supply 38, an output driver 34, an output driver 37, an output driver 40, and a display 50. The processor 30 integrally controls the charger 10. The processor 30 may be constituted by, for example, any one of a micro processing unit (MPU), a central processing unit (CPU), and a digital signal processor (DSP). The processor 30 may also be constituted by a dedicated electronic circuit designed by, for example, an application specific integrated circuit (ASIC) or an electronic circuit designed to be reconfigurable by, for example, a field programmable gate array (FPGA).

For example, a VBUS line 61 connected to the VBUS terminal, a CC2 line 62 connected to the CC2 terminal, a CC1 line 63 connected to the CC1 terminal, a D+ line 64 connected to the D+ terminal, and a D− line connected to the D− terminal are connected to the processor 30. Since the D− terminal is the same as the D+ line, illustration thereof is omitted.

A resistor R7 that serves as a pull-down resistor having a resistance value (for example, 500 kΩ) larger than a resistance value (for example, 20 kΩ to 200 kΩ) of the water droplet is connected to the VBUS line 61 that is connected to the VBUS terminal. Similarly, a resistor R8 that serves as a pull-down resistor having a resistance value (for example, 500 kΩ) larger than the resistance value (for example, 20 kΩ to 200 kΩ) of the water droplet is connected to the D+ line 64 that is connected to the D+ terminal.

Each of the voltage detectors 31, 33, 36, and 39 incorporates an A/D converter that converts an input analog voltage value into a digital voltage value. The voltage detector 31 detects a voltage of the VBUS terminal. The voltage detector 33 detects a voltage of the CC2 terminal. The voltage detector 36 detects a voltage of the CC1 terminal. The voltage detector 39 detects a voltage of the D+ terminal.

The discharging circuit 32 switches between a state where the VBUS line 61 and GND (also referred to as the ground) are connected to each other and a state where the VBUS line 61 and the GND are disconnected from each other. By connecting the VBUS line 61 and the GND, charges are discharged from the VBUS line 61.

As shown in FIG. 2, when the USB plug 80 is connected to the USB receptacle 15, the power supply generator 12 supplies the charging voltage to the external device 90 via the VBUS line 61.

The power supply 35 supplies power to the CC2 terminal. The power supply 38 supplies power to the CC1 terminal. As a power supply method thereof, there is a method of supplying a voltage from a voltage source via a resistor and a method of supplying a constant current from a constant current source. The power supply performed by the power sources 35 and 38 is also performed when the USB plug 80 is not connected to the USB receptacle 15. Therefore, when the conductive foreign substance is adhered to the CC1 terminal, ion migration may occur around the CC1 terminal, for example, during a period when the USB plug 80 is not connected. When the USB plug 80 is not connected to the USB receptacle 15, basically, no voltage or current is supplied to the other terminals. Therefore, when the CC terminal is absent, ion migration basically does not occur except around the CC terminal.

When the USB plug 80 is connected to the USB receptacle 15, each of the output drivers 34 and 37 generates a signal to be communicated for negotiation with the external device 90 connected to the USB receptacle 15. This signal is called a CC signal. The CC signal is generated when the output drivers 34 and 37 correspond to USB-PD. The output driver 40 also generates a predetermined signal to be communicated via the D+ terminal. The predetermined signal is generated when the output driver 40 performs communication by using the D+ terminal or the D− terminal.

The display 50 generates a notification of foreign substance adhesion information indicating that the foreign substance is adhered to the terminal of the USB receptacle 15. The foreign substance adhesion information may be information indicating that charging performed by the charger 10 is not possible, or other information. The display 50 may be, for example, a light emitting diode (LED), a liquid crystal display (LCD), or an electronic luminescent (EL) element. The display 50 may not only turn on or off the light, but also display, for example, a message, a mark, or an image. The display 50 may also be substituted by, for example, another display apparatus arranged in the vehicle. Examples of the other display apparatus arranged in the vehicle include a car navigation apparatus, a display audio apparatus, and a display of another in-vehicle apparatus. Instead of the display 50, a presentation device that presents the foreign substance adhesion information by sound output or vibration may be provided. Examples of the presentation device include a speaker and a vibrator.

Figure 5:
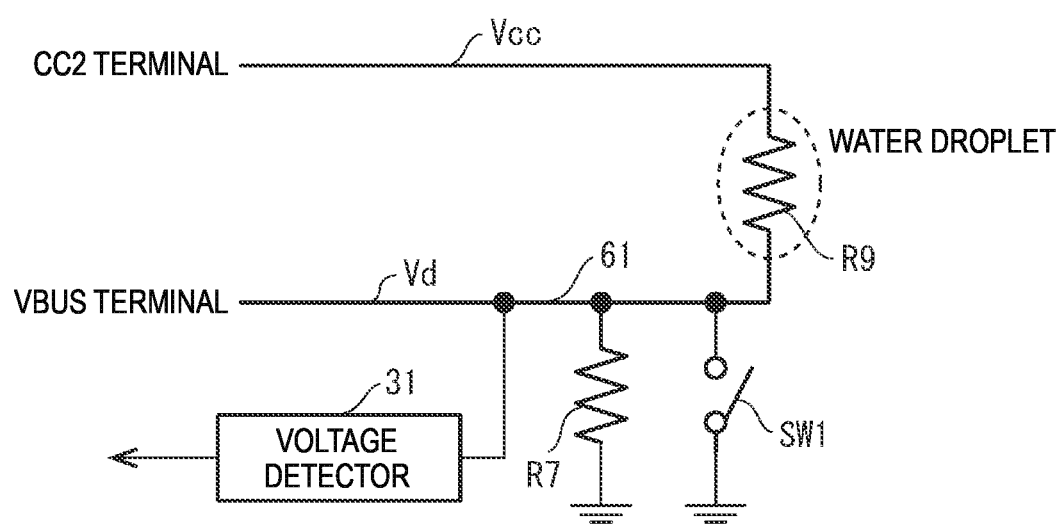
FIG. 5 shows an operation principle of a circuit that determines whether a conductive foreign substance is adhered to a terminal of the USB receptacle.

FIG. 5 shows an operation principle of a circuit that determines whether the foreign substance is adhered to the terminal of the USB receptacle 15. Here, the CC2 terminal and the adjacent VBUS terminal will be described as an example. It should be noted that the same also applies to the CC1 terminal and the other adjacent terminals. In addition, here, the water droplet serves as an example of the foreign substance.

The power supply 35 is connected to the CC2 terminal. The power supply 35 is, for example, a constant current source of 330 μA or a constant voltage source of 1.7V to 5.5V. The voltage detector 31 is connected to the VBUS terminal, and can detect a voltage applied to the VBUS line 61. That is, the voltage of the VBUS terminal can be detected by the voltage detector 31. The resistor R7 that serves as the pull-down resistor is connected to the VBUS line 61.

A switch SW1 is a switch of the discharging circuit 32. The switch SW1 switches between the state where the VBUS line 61 and the GND are connected to each other and the state where the VBUS line 61 and the GND are disconnected from each other. The state where the VBUS line 61 and the GND are connected is a state where the switch SW1 is on. The state where the VBUS line 61 and the GND are disconnected is a state where the switch SW1 is off. When the USB plug 80 is not connected to the USB receptacle 15, the processor 30 turns on the switch SW1 at predetermined timing. As a result, charges staying in the VBUS line 61 are discharged, and a voltage supplied to the VBUS terminal rapidly falls to nearly 0V. When determining adhesion of the foreign substance, the processor 30 turns off the switch SW1 to prevent the discharging circuit 32 from discharging.

When the water droplet does not enter the USB receptacle 15 and the water droplet does not stay between the CC2 terminal and the VBUS terminal, the VBUS terminal is electrically independent from the CC2 terminal. That is, the voltage of the VBUS terminal is not affected by the voltage of the CC2 terminal. Therefore, the voltage detector 31 detects a GND voltage. This is because the VBUS line 61 is grounded by the resistor R7.

On the other hand, when the water droplet enters the USB receptacle 15 and stays between the CC2 terminal and the VBUS terminal, the CC2 terminal and the VBUS terminal are connected by resistor R9 of the water droplet. The resistor R9 of the water droplet is about 20 kΩ to 200 kΩ. A supply voltage Vcc of the CC2 terminal is also applied to the VBUS terminal via the resistor R9. The voltage detector 31 detects a voltage obtained by dividing the supply voltage Vcc by the resistor R7 and the resistor R9. Therefore, when a voltage Vd shown in Formula (1) is detected by the voltage detector 31, the processor 30 can determine that the conductive foreign substance is present between the CC2 terminal and the VBUS terminal.

$$Vd = Vcc \times R7/(R7+R9) \tag{1}$$

The processor 30 can determine presence or absence of a foreign substance by the same method also between the CC2 terminal and the D+ terminal, between the CC1 terminal and the VBUS terminal, and between the CC1 terminal and the D+ terminal.

Next, a foreign substance detection operation of the charger 10 will be described.

Figure 6:
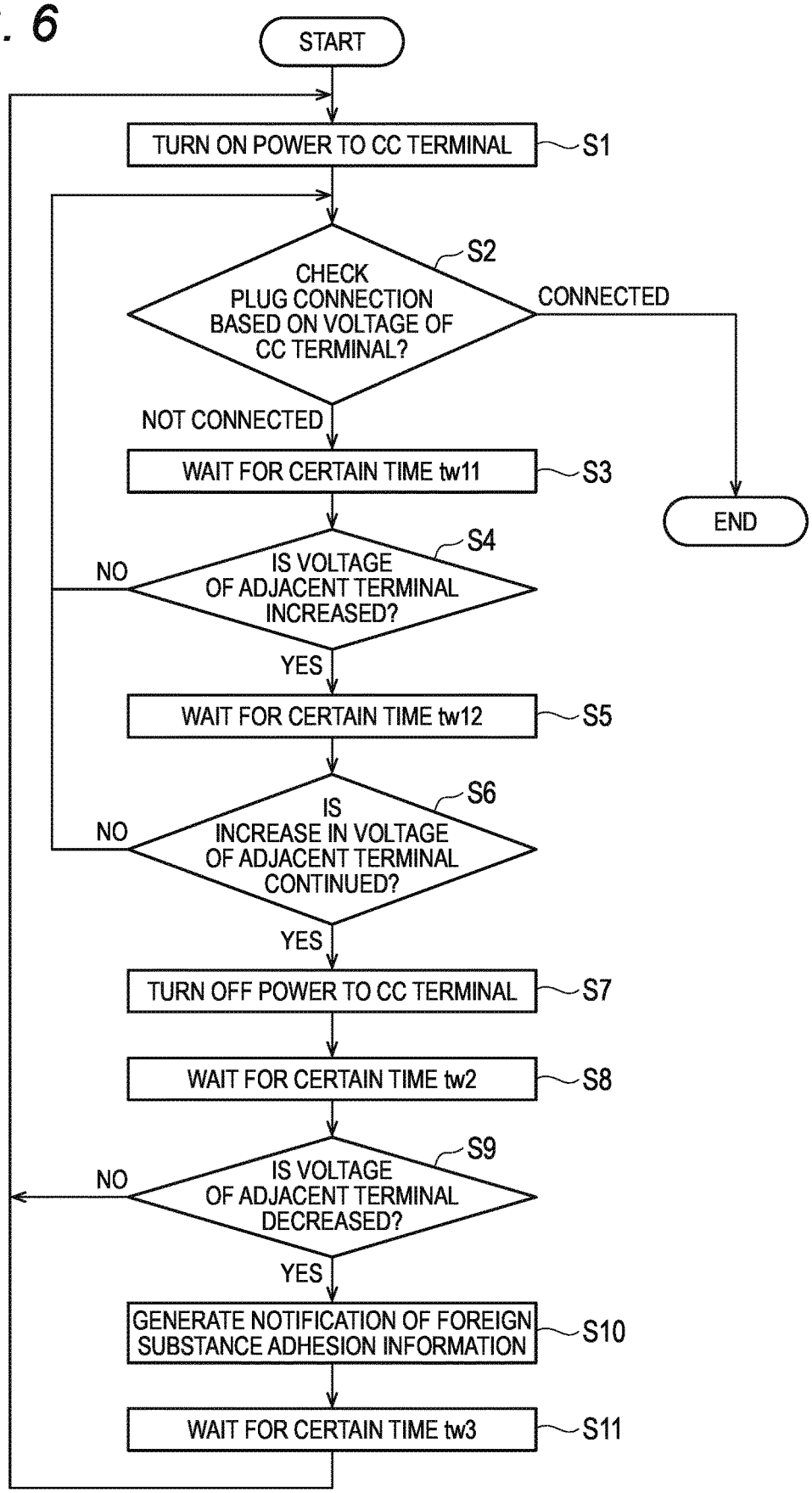
FIG. 6 is a flowchart showing a foreign substance detection procedure.

FIG. 6 is a flowchart showing a foreign substance detection procedure. An operation of FIG. 6 is started, for example, when the ignition key is switched to ACC ON.

In an initial state immediately after switching to ACC ON, the switch SW1 of the discharging circuit 32 is in an OFF state, and the output driver 40 of the D+ terminal is also in an OFF state. That is, the output driver 40 does not output any voltage to the D+ terminal. Therefore, in the initial state, voltages of the VBUS terminal and the D+ terminal are both near 0V.

The processor 30 turns on the power to the CC terminal (S1). That is, the processor 30 gives an instruction to turn on the power supply 38 of the CC1 terminal and the power supply 35 of the CC2 terminal. In this case, a predetermined current or voltage is supplied from the power supply 38 to the CC1 terminal. A predetermined current or voltage is supplied from the power supply 35 to the CC2 terminal.

The processor 30 acquires a voltage V1 of the CC terminal and determines whether the voltage V1 is equal to or higher than a threshold value Vth1. That is, the processor 30 determines whether the USB plug 80 is connected to the USB receptacle 15 (S2).

When the USB plug 80 is not connected, the voltage V1 of the CC terminal is, for example, 5V. On the other hand, when the USB plug 80 is connected, the voltage V1 of the CC terminal is lower as compared with the case where the USB plug 80 is not connected. When the USB plug 80 is connected, the voltage V1 of the CC terminal is, for example, 1.5V. This voltage drop is caused since the pull-down resistor is connected to the CC terminal and the voltage supplied to the CC terminal is divided due to the connection of the USB plug 80.

The threshold value Vth1 is a voltage for determining whether the USB plug 80 is connected. The threshold value Vth1 is set to, for example, a voltage between the voltage when the USB plug 80 is connected and the voltage when the USB plug 80 is not connected.

When it is determined that the USB plug 80 is connected to the USB receptacle 15, the processor 30 stops the foreign substance detection operation and ends the process of FIG. 6.

When it is determined that the USB plug 80 is not connected to the USB receptacle 15, the processor 30 waits for a certain time tw11 (S3). After waiting for the certain time tw11, the processor 30 determines whether a voltage V2 of the adjacent terminal (the VBUS terminal and the D+ terminal) adjacent to the CC terminal is equal to or higher than a threshold value Vth2, that is, determines whether the voltage V2 is increased (S4). The certain time tw11 may be a time required for a voltage increase caused by ion migration to be stabilized. It should be noted that it is not essential to wait for the certain time tw11 between the determination of the connection between the USB receptacle 15 and the USB plug 80 and the determination of the voltage V2.

When the voltage V2 is equal to or higher than the threshold value Vth2, the processor 30 waits for a certain time tw12 (S5). The certain time tw12 is, for example, several tens of seconds. On the other hand, when a predetermined time has elapsed, resistance between the terminals is decreased due to ion migration, that is, movement of metal. Therefore, the certain time tw12 is set to be shorter than the predetermined time.

After waiting for the certain time tw12, the processor 30 again determines whether the voltage V2 is equal to or higher than the threshold value Vth2, that is, determines whether the increase in the voltage V2 is continued (S6). As a result, it is possible to determine whether the voltage V2 is instantaneously increased due to noise or the voltage V2 is increased due to adhesion of a foreign substance. It should be noted that S5 and S6 are not essential. That is, the determination of the increase in the voltage V2 of the adjacent terminal may be performed only once.

Specifically, in S4 and S6, the processor 30 determines whether a voltage V21 of the VBUS terminal and a voltage V22 of the D+ terminal adjacent to the CC1 terminal are equal to or higher than the threshold value Vth2. Each of the voltage V21 and the voltage V22 is one voltage V2 of the adjacent terminal. The increase in the voltage V2 of the adjacent terminal may be caused since the CC terminal and the adjacent terminal are connected to each other via a foreign substance. In S4 and S6, when each voltage of the adjacent terminal is not increased, the process proceeds to S2.

Although a specific example of the determination of the voltage V2 of the adjacent terminal adjacent to the CC1 terminal has been described here, the same also applies to determination of the voltage V2 of the adjacent terminal adjacent to the CC2 terminal. In addition, the determination of the voltage V2 of the adjacent terminal adjacent to the CC1 terminal and the determination of the voltage V2 of the adjacent terminal adjacent to the CC2 terminal may both be performed.

On the other hand, when the voltage V2 of at least one adjacent terminal is increased in S4, the process proceeds to S5 as described above. In S6, when the voltage V2 of at least one adjacent terminal is increased, the processor 30 turns off the power supply of the CC terminal. That is, the processor 30 gives an instruction to turn off the power supply 38 of the CC1 terminal and the power supply 35 of the CC2 terminal (S7).

As a result, the application of voltage or current to the CC terminal is stopped, and thus progress of the ion migration can be prevented. Therefore, corrosion and deterioration of each terminal in the USB receptacle 15 can be prevented. In particular, corrosion and deterioration of the terminals around the CC terminal can be prevented.

When it is determined that the voltage V21 of the VBUS terminal and the voltage V22 of the D+ terminal near the CC1 terminal are increased while it is determined that the voltage V21 of the VBUS terminal and the voltage V22 of the D+ terminal near the CC2 terminal are not increased, the processor 30 may turn off the power supply 38 that supplies the voltage to the CC1 terminal and keep an on-state of the power supply 35 that supplies the voltage to the CC2 terminal. The same also applies to a case where the CC1 terminal and the CC2 terminal are reversed.

The processor 30 waits for a certain time tw2 since the power supplies 38 and 35 are turned off until the voltage V2 of the adjacent terminal is stabilized (S8). The certain time tw2 may be a time required for the voltage V2 of the adjacent terminal to stably drop based on power-off of the CC terminal.

After waiting for the certain time tw2, the processor 30 determines whether the voltage V2 of the adjacent terminal is decreased (S9). That is, the processor 30 determines whether the voltage V2 of the VBUS terminal and the D+ terminal adjacent to the CC1 terminal is equal to or lower than a threshold value Vth3. Similarly, the processor 30 determines whether the voltage V2 of the VBUS terminal and the D+ terminal adjacent to the CC2 terminal is equal to or lower than the threshold value Vth3. The threshold value Vth3 is smaller than the threshold value Vth2.

When the voltage V2 of the adjacent terminal is not decreased, the processor 30 determines that the voltage V2 of at least one adjacent terminal is increased for a reason different from the reason that the CC terminal and the adjacent terminal are connected via the foreign substance, the process proceeds to S1, and the same process is repeated. In this case, the processor 30 may cause the display 50 to display warning information indicating a possibility that the voltage of the adjacent terminal is increased for a reason different from the reason that the CC terminal and the adjacent terminal are connected via the foreign substance. In addition, in this case, due to the possibility that the voltage V2 of the adjacent terminal is unexpectedly increased due to a factor different from the factor that the CC terminal and the adjacent terminal are connected via the foreign substance, the process of FIG. 6 may be ended without proceeding to S1.

On the other hand, when it is confirmed in S9 that the voltage is decreased, the processor 30 determines that the voltage V2 of at least one adjacent terminal is increased since the CC terminal and the adjacent terminal are connected via the foreign substance. The processor 30, for example, turns on the display 50 to notify a user of foreign substance adhesion information indicating that the foreign substance is adhered to the USB receptacle 15 (S10). It should be noted that S10 may be omitted.

The processor 30 waits for a certain time tw3 (S11). The certain time tw3 may be a time required for the user to wipe off the foreign substance adhering to the USB receptacle 15 or dry the water droplet. The foreign substance may be removed not only by wiping with cloth, a cotton swab, or the like, but also by removing with a toothpick or blowing with an air duster. In this manner, the user removes the foreign substance after confirming the foreign substance adhesion information, and thus the progress of the ion migration can be further prevented. Thereafter, the process proceeds to S1. That is, in a period when the ACC is turned on, the process of FIG. 6 is repeatedly performed.

The process of FIG. 6 may be ended, for example, when the ACC is turned off, when a certain time has elapsed since start of the process of FIG. 6, or when an instruction to end the foreign substance detection operation is given by a user operation via a predetermined user interface (UI). In addition, when the USB plug 80 is connected to the USB receptacle 15 in S3, the foreign substance detection operation is ended, and the foreign substance detection operation may be resumed when the USB plug 80 is removed from the USB receptacle 15. In addition, when the ACC is turned on in the state where the USB plug 80 is connected to the USB receptacle 15, it is detected in S3 that the USB plug 80 is connected to the USB receptacle 15, and the process of FIG. 6 is ended.

When the voltage V2 of the adjacent terminal is increased as the voltage V1 of the CC terminal is increased, it is considered that an electric path is generated between the CC terminal and the adjacent terminal via the foreign substance due to the foreign substance adhering to the vicinity of the CC terminal, and thus the voltage of the CC terminal is also supplied to the adjacent terminal. In this case, there is a high possibility that ion migration from the CC terminal rapidly proceeds due to the foreign substance adhering to the CC terminal. The charger 10 can prevent continuous occurrence of ion migration by stopping the supply of voltage or current to the CC terminal.

As shown in S3 and subsequent steps shown in FIG. 6, the detection of the foreign substance performed by the charger 10 is performed when the USB plug 80 is not connected to the USB receptacle 15, and is not performed when the USB plug 80 is connected to the USB receptacle 15. In a period when the USB plug 80 is connected, a normal charging process is performed. In the normal charging process, for example, PD communication related to negotiation using the CC terminal or power supply via the VBUS terminal may be performed.

Although an example in which the processor 30 determines whether the voltage V2 of all the terminals (that is, the terminals on both sides) included in the adjacent terminal is increased In S4 has been described, the present disclosure is not limited thereto. For example, the processor 30 may only determine whether the voltage V2 of a terminal on one side with reference to the CC terminal among the adjacent terminal (for example, only the VBUS terminal or only the D+ terminal) is increased. In this case, for example, the voltage detector 31 may detect a voltage of only one of the adjacent terminals to determine whether the voltage V2 of only one of the adjacent terminals is increased. By determining by the charger 10 whether the voltage V2 of the adjacent terminal on both sides is increased, detection probability of the foreign substance adhering to the CC terminal can be improved. On the other hand, by determining by the charger 10 whether the voltage V2 of the adjacent terminal on one side is increased, a processing load of the processor 30 can be reduced.

Although an example in which the processor 30 determines whether the voltage V2 of all the terminals (that is, the terminals on both sides) included in the adjacent terminal is decreased In S9 has been described, the present disclosure is not limited thereto. For example, the processor 30 may only determine whether the voltage V2 of the terminal on one side with reference to the CC terminal among the adjacent terminal (for example, only the VBUS terminal or only the D+ terminal) is decreased. In addition, the processor 30 may only determine whether the voltage V2 of the terminal, whose voltage is determined to be increased in S4, among the adjacent terminal is decreased, This is because, when the voltage is not increased in S4, it can be determined that the terminal is not connected to the CC terminal via the foreign substance. By determining by the charger 10 whether the voltage V2 of the adjacent terminal on both sides is decreased, the detection probability of the foreign substance adhering to the CC terminal can be improved. By determining by the charger whether the voltage V2 of the adjacent terminal on one side is decreased, the processing load of the processor 30 can be reduced.

Figure 7:
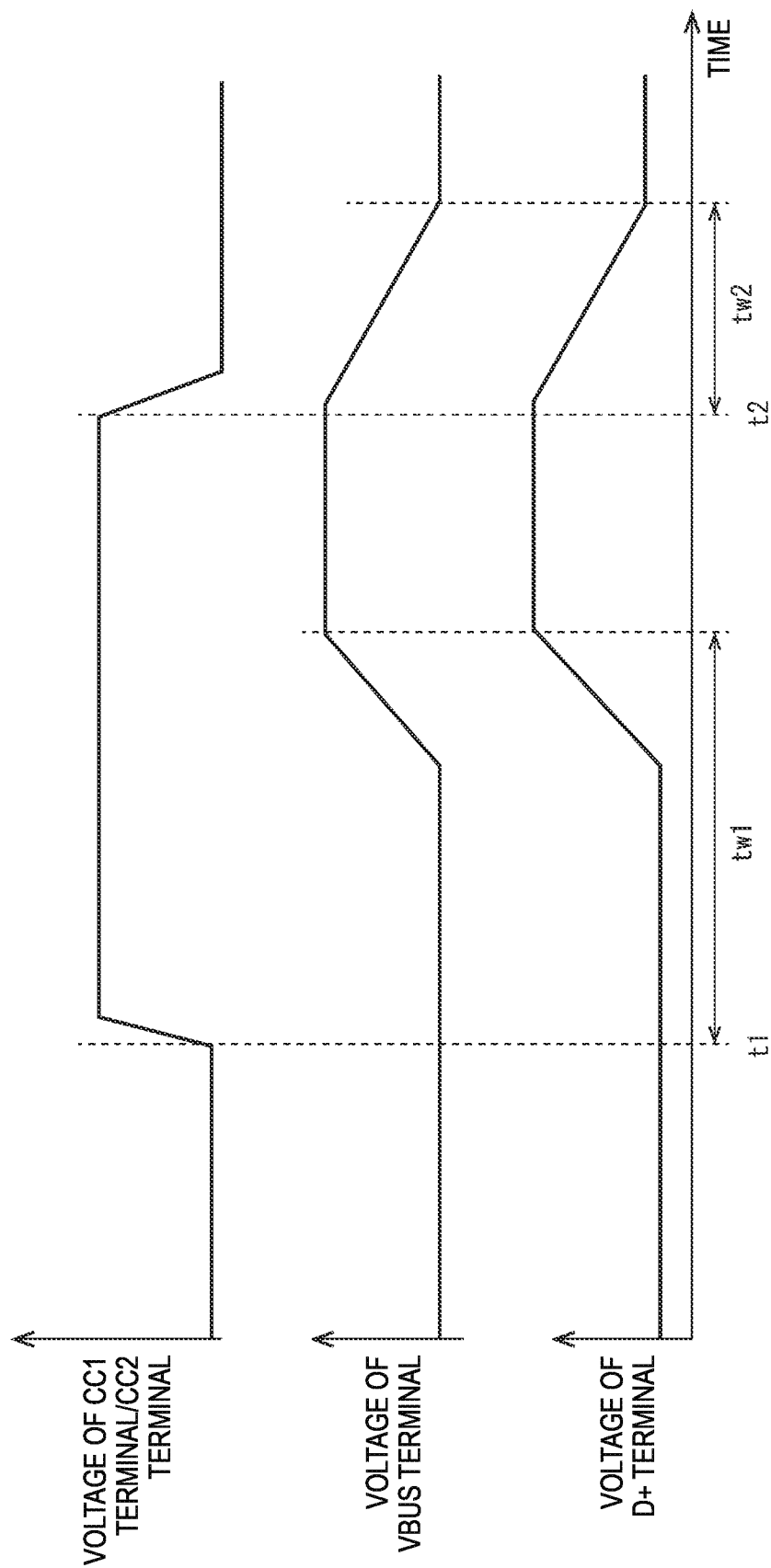
FIG. 7 is a timing chart showing a voltage change in the terminal of the USB receptacle during the foreign substance detection.

FIG. 7 is a timing chart showing a voltage change in each terminal of the USB receptacle 15 during the foreign substance detection.

After the ACC is turned on, a voltage is supplied to the CC terminal at timing t1. When the foreign substance is adhered to the CC terminal (CC1 terminal, CC2 terminal) and the adjacent terminal (VBUS terminal, D+ terminal) adjacent to the CC terminal of the USB receptacle 15, the voltage V2 of at least one adjacent terminal gradually increases with the lapse of the certain time tw1. This is because an electric path is generated between the CC terminal and the adjacent terminal via the foreign substance. For example, when there is a foreign substance between the CC1 terminal and the VBUS terminal adjacent to the CC1 terminal, the voltage V2 of the VBUS terminal is increased. For example, when there is a foreign substance between the CC2 terminal and the D+ terminal adjacent to the CC2 terminal, the voltage V2 of the D+ terminal is increased.

When the voltage V2 of the adjacent terminal is increased, the supply of the voltage V1 of the CC terminal is stopped at timing t2. Then, as the certain time tw2 elapses, the voltage of at least one adjacent terminal (for example, the adjacent terminal whose voltage V2 is increased) may gradually decrease. For example, when there is a foreign substance between the CC1 terminal and the VBUS terminal adjacent to the CC1 terminal, the supply of the voltage to the CC1 terminal is stopped, and thus the voltage V2 of the VBUS terminal adjacent to the CC1 terminal is decreased. For example, when there is a foreign substance between the CC2 terminal and the D+ terminal adjacent to the CC2 terminal, the supply of the voltage to the CC2 terminal is stopped, and thus the voltage V2 of the D+ terminal adjacent to the CC2 terminal is decreased.

When the increase and decrease in the voltage V2 of the adjacent terminal occur in accordance with the increase and decrease in the voltage V1 of the CC terminal, the processor 30 can determine that there is a high possibility that a foreign substance is present between the adjacent terminal where the increase and decrease in the voltage occur and the CC terminal in the USB receptacle 15.

As described above, when the voltage V2 of the adjacent terminal increases as the voltage V1 of the CC terminal is increased, the charger 10 can prevent the progress of the ion migration from the CC1 terminal by stopping the supply of the voltage or current to the CC terminal. After stopping the supply of the voltage or current to the CC terminal, the charger 10 can determine the decrease in the voltage V2 of the adjacent terminal and re-confirm whether the increase in the voltage of the adjacent terminal is caused by the presence of the foreign substance. That is, detection accuracy of the foreign substance can be improved. In addition, in recent years, a distance between the terminals in the USB receptacle 15 tends to be shorter, that is, a pitch of the terminals tends to be narrower. In this case, when the foreign substance is adhered in the vicinity of the CC terminal, an electric path is likely to be formed between the CC terminal and a peripheral terminal. In this regard, the charger 10 can detect the voltage V2 of the adjacent terminal that changes in accordance with the voltage V1 of the CC terminal via the foreign substance when the foreign substance is adhered in the vicinity of the CC terminal, and thus can easily detect the adhesion of the foreign substance in the vicinity of the CC terminal. By removing the detected foreign substance, corrosion and deterioration of the CC terminal and the adjacent terminal can be easily prevented.

The processor 30 displays the foreign substance adhesion information on the display 50, so that the user can visually recognize that the foreign substance is adhered to the USB receptacle 15. In addition, when the charger 10 is mounted on a vehicle, it is conceivable that the USB receptacle 15 of the charger 10 is arranged to face upward such that an occupant, namely the user, can easily use the charger 10. In this case, the battery charger 10 can still prevent the progress of the ion migration without the user covering the USB receptacle 15 with a cap.

(Modification)

In the above embodiment, an example in which it is determined whether the foreign substance is adhered between the CC terminal and the adjacent terminal adjacent to the CC terminal is described. In a modification, an example in which it is determined whether the foreign substance is adhered between the CC terminal and the peripheral terminal, that is, between the CC terminal and the terminal at three places away from the CC terminal, will be described.

In a charger according to the modification, the same constituent elements as those of the above-described embodiment are denoted by the same reference numerals, and description thereof will be omitted or simplified.

Figure 8:
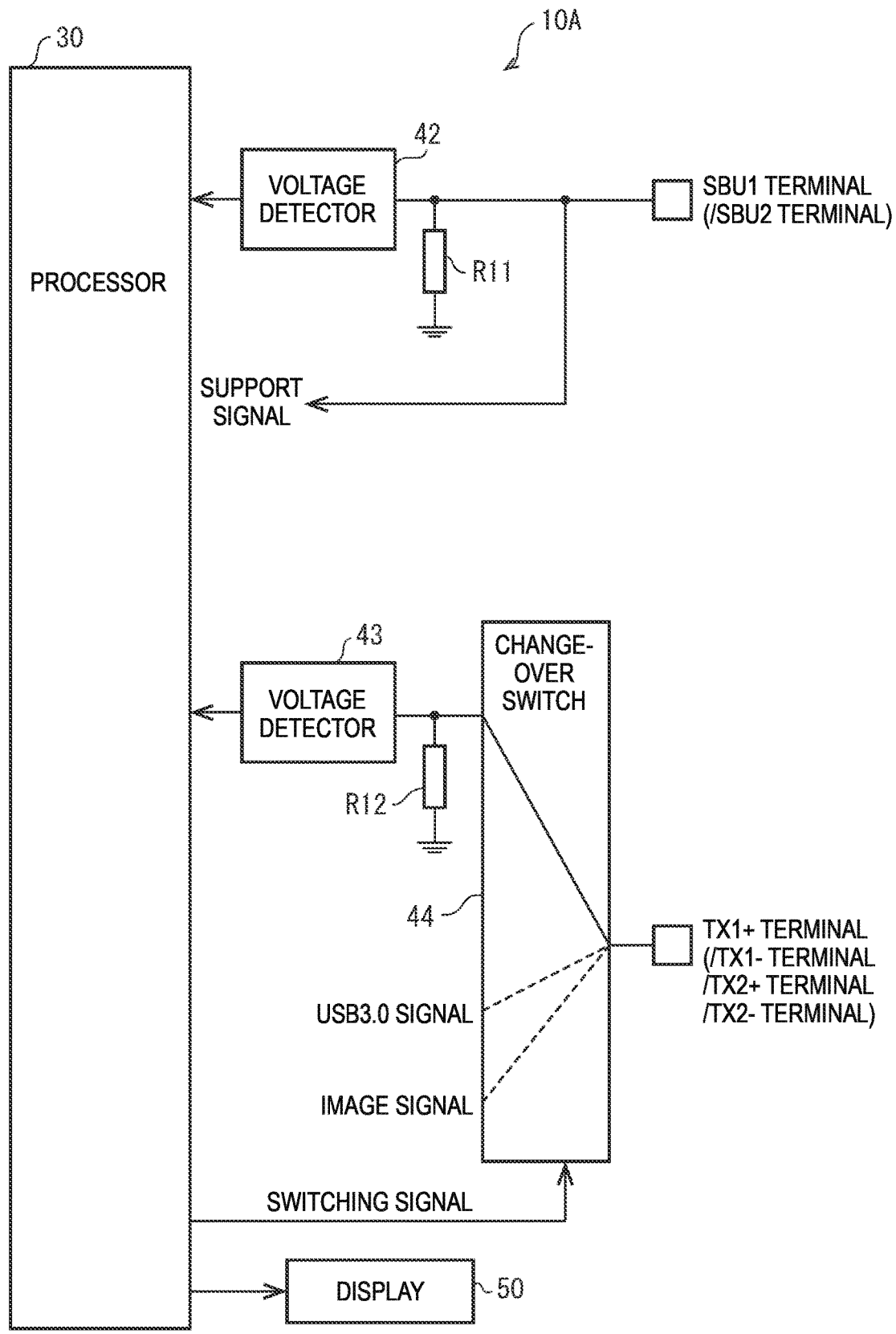
FIG. 8 shows a configuration of a portion related to foreign substance detection of a charger according to a modification.

FIG. 8 shows a configuration of a portion related to foreign substance detection of the charger 10 according to the modification. The charger 10 according to the modification includes the processor 30, voltage detectors 42 and 43, a changeover switch 44, and the display 50. In FIG. 8, the SBU terminal and the TX terminal are shown as an example. The SBU terminal includes the SBU1 terminal and the SBU2 terminal. The TX terminal includes the TX1+ terminal, the TX1− terminal, the TX2+ terminal, and the TX2− terminal. Although omitted in FIG. 8, the charger 10 according to the modification may have the configuration of the charger 10 described in the above embodiment. That is, the charger 10 according to the modification may have a configuration for detecting a foreign substance between the peripheral terminal including the adjacent terminal and the CC terminal.

The voltage detector 42 includes an A/D converter, and detects a voltage of the SBU1 terminal as a digital voltage value. Here, the SBU1 terminal will be described, and the same also applies to the SBU2 terminal. An SBU line connected to the SBU1 terminal or the SBU2 terminal is a signal line that becomes active in an alternate mode. A resistor R11 is connected to the SBU line as a pull-down resistor connected to the GND. The resistor R11 has a resistance value (for example, 1 MΩ) that is sufficiently larger than a resistance value of the foreign substance (for example, a water droplet). The SBU1 terminal is used for future expansion or for display support, and outputs a support signal. It should be noted that the SBU1 terminal may be used exclusively for foreign substance detection without outputting the support signal.

As in the description of the above-described embodiment, when the foreign substance is adhered to the SBU1 terminal, the processor 30 detects, as the voltage of the SBU1 terminal, a divided voltage obtained by dividing the voltage supplied from the CC terminal by resistance of the foreign substance and the resistor R11.

The voltage detector 43 includes an A/D converter, and detects an output voltage of the changeover switch 44 as a digital voltage value.

The changeover switch 44 always internally connects the TX1+ terminal to the voltage detector 43 either when the USB plug 80 is connected or when the USB plug 80 is not connected. Therefore, the voltage detector 43 can always detect a voltage of the TX1+ terminal. Therefore, the voltage detector 43 can detect an increase and a decrease in the voltage V2 of the TX1+ terminal in the foreign substance detection procedure (see FIG. 6) performed when the USB plug 80 is not connected. Here, the TX1+ terminal is described, and the same also applies to the TX1− terminal, the TX2+ terminal, and the TX2− terminal.

A resistor R12 is connected to an output line of the changeover switch 44 as a pull-down resistor connected to the GND. The resistor R12 has a resistance value (for example, 1 MΩ) that is sufficiently larger than the resistance value of the foreign substance. When the foreign substance is adhered to the TX1+ terminal, the processor 30 detects, as the voltage of the TX1+ terminal, a divided voltage obtained by dividing the voltage supplied from the CC terminal by the resistance of the foreign substance and the resistor R12.

The processor 30 generates a switching signal for selecting a target signal of the TX1+ terminal based on a direction of a connector of the USB plug 80 connected to the USB receptacle 15. When the USB plug 80 is connected to the USB receptacle 15, the changeover switch 44 switches the target signal in accordance with the switching signal from the processor 30 and outputs the target signal to the processor 30. The target signal is, for example, a USB 3.0 signal or an image signal.

As described above, in the charger 10 according to the modification, the processor 30 can determine presence or absence of the adhesion of the foreign substance by using the terminals from the CC1 terminal or the CC2 terminal to the terminals at three places away from the CC terminal (for example, the VBUS terminal, the D+ terminal, the D− terminal, the TX1+ terminal, the TX1− terminal, the TX2+ terminal, the TX2− terminal, the SBU1 terminal, and the SBU2 terminal). In this case, similarly to the voltage V2 of the adjacent terminal, the presence or absence of the adhesion of the foreign substance around the CC terminal can be determined based on the voltage V2 of the peripheral terminal. Therefore, even when the foreign substance is adhered over a wide range inside the USB receptacle 15, the charger 10 can determine the presence or absence of the foreign substance adhering to the CC terminal and prevent progress of ion migration. Here, the charger 10 can determine the presence or absence of the adhesion of the foreign substance by confirming the increase and decrease of the voltage of the peripheral terminal arranged around the CC terminal without requiring the user to visually recognize a degree of the adhesion of the foreign substance. Upon being notified of the adhesion of the foreign substance from the charger 10, the user can take appropriate measures for the adhesion of the foreign substance. Although the foreign substance can be detected between the CC terminal and the terminals at three places away from the CC terminal, detection accuracy of the foreign substance is highest between the CC terminal and the terminal at one place away from the CC terminal. For example, even when the foreign substance is very small and is in contact only with the CC terminal and the terminal at one place away from the CC terminal, the foreign substance can be detected by using the terminal at one place away from the CC terminal.

As described above, the charger 10 according to the present embodiment includes the USB receptacle 15 in which the plurality of terminals are arranged, and the power supplies 38 and 35 that supply a voltage or a current to the CC terminal (for example, the CC1 terminal and the CC2 terminal) included in the plurality of terminals. Here, the charger 10 is an example of a charging apparatus. The CC terminal is an example of a first terminal. The charger 10 includes the voltage detectors 36 and 33 that detect the voltage V1 of the CC terminal. Here, the voltage detectors 36 and 33 are an example of a first voltage detector. The charger 10 includes the voltage detector 31 that detects the voltage V2 of the peripheral terminal (for example, the VBUS terminal, the D+ terminal, the D− terminal, the TX1− terminal, the TX1+ terminal, the TX2+ terminal, the TX2− terminal, the SBU1 terminal, and the SBU2 terminal) that is included in the plurality of terminals and is a terminal at one place, two places or three places away from the CC terminal. Here, the peripheral terminal is an example of a second terminal. The voltage detector 31 is an example of a second voltage detector. The charger 10 includes the processor 30 (an example of a controller) that determines whether the voltage V2 of the peripheral terminal is equal to or higher than the threshold value Vth2 during a period when the voltage V1 of the CC terminal is equal to or higher than the threshold value Vth1, and stops the supply of the voltage or the current from the power supplies 38 and 35 to the CC terminal when the voltage V2 is equal to or higher than the threshold value Vth2. Here, the threshold value Vth1 is an example of a first threshold value. The threshold value Vth2 is an example of a second threshold value. The processor 30 is an example of a controller.

When the voltage of the peripheral terminal is increased as the voltage V1 of the CC terminal is increased, it is considered that an electric path is generated between the CC terminal and the peripheral terminal via the foreign substance due to the foreign substance adhering around the CC terminal, and thus the voltage of the CC terminal is also supplied to the peripheral terminal. In this case, there is a high possibility that ion migration occurs. In this case, the charger 10 can prevent continuous occurrence of the ion migration by stopping the supply of the voltage or the current to the CC terminal. In this way, the charger 10 can prevent the occurrence of the ion migration in the USB receptacle 15.

The charger 10 may include the display 50. Here, the display 50 is an example of a presentation device. When the supply of the voltage or the current from the power supplies 38 and 35 to the CC terminal is stopped, the processor 30 may cause the display 50 to display the foreign substance adhesion information indicating that the foreign substance is adhered between the CC terminal and the peripheral terminal. Here, the display is an example of presentation.

As a result, the user can visually recognize the adhesion of the foreign substance. After the user confirms the foreign substance adhesion information, if the foreign substance is liquid such as a water droplet, the liquid is naturally dried while the charger 10 waits for a certain time, and thus the progress of the ion migration can be prevented. In addition, after confirming the foreign substance adhesion information, the user can wipe off the foreign substance with a cotton swab, removing the foreign substance with a toothpick, or blowing off the foreign substance with an air duster and thus prevent the progress of the ion migration.

When the voltage V2 of the VBUS terminal or the like becomes less than the threshold value Vth2 in response to the stop of the supply of the voltage or the current from the power supplies 38 and 35 to the CC1 terminal and the CC2 terminal, the processor 30 may cause the display 50 to display the foreign substance adhesion information.

When the voltage of the peripheral terminal is decreased as the voltage of the CC terminal is decreased, an electric path is generated between the CC terminal and the peripheral terminal via the foreign substance since the foreign substance such as the water droplet is adhered around the CC terminal, and it can be said that the voltage of the CC terminal is also supplied to the peripheral terminal. Therefore, the charger 10 can detect the adhesion of the foreign substance with higher accuracy. In this case, since the foreign substance adhesion information can be confirmed, for example, when the foreign substance is liquid such as the water droplet, the user can prevent the progress of the ion migration by naturally drying the liquid. In addition, after confirming the foreign substance adhesion information, the user can wipe off the foreign substance with a cotton swab, removing the foreign substance with a toothpick, or blowing off the foreign substance with an air duster and thus prevent the progress of the ion migration.

The processor 30 may determine whether the USB receptacle 15 is connected to the external device 90 including the USB plug 80. When the USB receptacle 15 is connected to the external device 90, it is not necessary to determine whether the voltage V2 of the peripheral terminal is equal to or higher than the threshold value Vth2.

As a result, the processor 30 does not determine the presence or absence of the foreign substance when the USB plug 80 is connected, that is, when the external device is connected. This is because, when the USB plug 80 is connected, the USB receptacle 15 and the USB plug 80 are engaged with each other, and it is difficult for the foreign substance to enter the inside of the USB receptacle 15. In addition, when the USB receptacle 15 is connected to the USB plug 80, the voltage V1 of the CC terminal is lower as compared with a case where the USB plug 80 is not connected, so that the progress of the ion migration is slower as compared with a case where the voltage V1 of the CC terminal is high.

The CC terminal may receive the supply of the voltage or the current from each of the power supplies 38 and 35 in a period when the terminal of the USB plug 80 is not electrically connected. On the other hand, the peripheral terminal may not receive the supply of the voltage or the current from the power supply generator 12 in a period when the terminal of the USB plug 80 is not electrically connected. The power supply generator 12 is an example of a power supply.

During the period when the USB plug 80 is not connected to the USB receptacle 15, the foreign substance is likely to enter the USB receptacle 15. The charger 10 determines the presence or absence of the foreign substance by using the CC terminal to which the voltage is applied even in a period when the terminal of the USB plug 80 is not electrically connected to the USB receptacle 15, and stops the supply of the voltage or the current to the CC terminal as necessary, thereby preventing the progress of the ion migration. In addition, although the peripheral terminal does not receive the supply of the voltage or the current, the voltage V2 of the peripheral terminal may increase or decrease in conjunction with an increase or decrease of the voltage V1 or the current of the CC terminal. The charger 10 can take measures to prevent the occurrence or progress of the ion migration by detecting the increase or decrease of the voltage V2 of the peripheral terminal.

The charger 10 may perform charging by a charging method conforming to USB Type-C.

As a result, in the charger 10 having a charging function conforming to USB Type-C, the progress of the ion migration can be prevented.

The CC terminal may be at least one of the CC1 terminal and the CC2 terminal. The peripheral terminal may be at least one of the VBUS terminal, the D+ terminal, the D− terminal, the TX1− terminal, the TX1+ terminal, the TX2− terminal, the TX2+ terminal, the SBU1 terminal, and the SBU2 terminal.

As a result, the charger 10 can determine the presence or absence of the foreign substance by using the voltages of the terminals located in the vicinity of the CC1 terminal and the CC2 terminal. The charger 10 can prevent the progress of the ion migration by stopping the supply of the voltage or the current to the CC terminal when it is determined that there is a foreign substance while a state where the external device 90 is connectable by the CC terminal is maintained. The charger 10 can determine the presence or absence of the adhesion of the foreign substance even when the foreign substance is adhered to the inside of the USB receptacle 15 over a wide range. For example, by confirming the increase and decrease of the voltage of each of the terminals included in the peripheral terminal, the user can determine the presence or absence of the ion migration without visually recognizing the degree of the adhesion of the foreign substance. Therefore, an appropriate removal operation of the foreign substance can be performed in accordance with the degree of the adhesion of the foreign substance.

The charger 10 may be mounted on a vehicle. Since the vehicle is movable to any place as desired, the charger 10 is placed in various environments. For example, even when the charger 10 is placed in a severe environment in which the ion migration is likely to occur, the charger 10 can easily determine the adhesion of the foreign substance and prevent the progress of the ion migration. The severe environment is, for example, a high-temperature environment or a high-humidity environment. In addition, even in a case where the USB receptacle 15 of the charger is arranged to face upward such that an occupant, namely the user, can easily use, the charger 10 can prevent the progress of the ion migration without covering the USB receptacle 15 with a cap.

Although various embodiments have been described above with reference to the drawings, it is needless to say that the present disclosure is not limited to such examples. It is apparent that those skilled in the art can conceive of various modifications and alterations within the scope described in the claims, and it is understood that such modifications and alterations naturally belong to the technical scope of the present disclosure. In addition, the constituent elements in each embodiment may be combined as desired without departing from the scope of the invention.

In the above embodiment, when the voltage of any one of the terminals of the USB receptacle 15 is increased, the display 50 displays the adhesion of the foreign substance and the occurrence of the ion migration. In this case, as more detailed information, the display 50 may generate a notification indicating which terminal the foreign substance is adhered to. For example, by checking the voltage V2 is increased in which terminal of the adjacent terminal, the processor 30 can recognize that the foreign substance is highly likely to be adhered between this terminal of the adjacent terminal and the CC terminal. The user can check the display and know the terminal where the foreign substance is adhered, thereby cleaning the terminal carefully. In addition, the user can also estimate a reason why the foreign substance is adhered to the terminal.

Although an example in which electric components such as the individual voltage detector and the output driver are provided for each terminal in the USB receptacle 15 as shown in FIG. 4 is described in the above embodiment, for example, the electric components such as the voltage detector and the output driver may be shared by a plurality of terminals. The electric components for the plurality of terminals may be mounted on one integrated circuit (IC).

Although an example in which the charger 10 mainly operates based on the voltage, such as the supply of the voltage to the CC terminal or the peripheral terminal, the stop of the supply of the voltage, and the detection of the voltage is described in the above embodiment, for example, the operation may be performed based on the current, such as start of the supply of the current to the CC terminal or the peripheral terminal, stop of the supply of the current, and the detection of the current.

Although a USB form of the charger 10 is USB Type-C in the above embodiment, the present disclosure is not limited thereto. For example, the above-described embodiment can be applied to a USB form having a terminal corresponding to a terminal to which a voltage or a current is constantly supplied, such as the CC terminal, and in which ion migration may occur due to conduction.

Although the voltage detection and the foreign substance detection operation are performed based on the combination of the VBUS terminal and the D+ terminal that serve as the adjacent terminal in FIG. 4, and the voltage detection and the foreign substance detection operation are performed based on the combination of the SBU terminal and the TX terminal that serve as the peripheral terminal in FIG. 8 in the above embodiment, the present disclosure is not limited thereto. For example, as the peripheral terminal, a combination of the D+ terminal and the TX terminal or a combination of the VBUS terminal may be selected and combined as desired one by one from the peripheral terminal on both sides relative to the CC terminal, and the voltage detection or the foreign substance detection operation may be performed based on this combination.

The present application is based on Japanese Patent Application filed on Jun. 27, 2019 (patent application number 2019-120433), the contents of which are incorporated herein as a reference.

The present disclosure is useful for a charging apparatus and a receptacle control method capable of preventing progress of ion migration in a receptacle of the charging apparatus.

The invention claimed is:

1. A charging apparatus comprising:
a receptacle comprising a plurality of terminals;
a power supply configured to supply a voltage or a current to a first terminal included in the plurality of terminals;
a first voltage detector configured to detect a voltage of the first terminal;
a second voltage detector configured to detect a voltage of a second terminal included in the plurality of terminals, the second terminal being a terminal at one place, two places or three places away from the first terminal; and
a processor configured to determine whether the voltage of the second terminal is equal to or higher than a second threshold value during a period in which the voltage of the first terminal is equal to or higher than a first threshold value, and stop supply of the voltage or the current from the power supply to the first terminal in a case in which the voltage of the second terminal is equal to or higher than the second threshold value.

2. The charging apparatus according to claim 1, further comprising:
a presentation device,
wherein in a case in which the supply of the voltage or the current from the power supply to the first terminal is stopped, the processor causes the presentation device to present foreign substance adhesion information indicating that a foreign substance is adhered between the first terminal and the second terminal.

3. The charging apparatus according to claim 2,
wherein the processor causes the presentation device to present the foreign substance adhesion information in a case in which the voltage of the second terminal becomes less than the second threshold value in response to a stop of the supply of the voltage or the current from the power supply to the first terminal.

4. The charging apparatus according to claim 3,
wherein the processor is configured to cause the presentation device to present the foreign substance adhesion information in a case in which the voltage of the second terminal becomes equal to or less than a third threshold value smaller than the second threshold value in response to the stop of the supply of the voltage or the current from the power supply to the first terminal.

5. The charging apparatus according to claim 2,
wherein the presentation device comprises a display.

6. The charging apparatus according to claim 1,
wherein the processor determines whether the first terminal is connected to an external device, and wherein the processor does not determine whether the voltage of the second terminal is equal to or higher than the second threshold value in a case in which it is determined that the first terminal is connected to the external device.

7. The charging apparatus according to claim 6,
wherein the first terminal receives the supply of the voltage or the current from the power supply in a period in which a terminal of the external device is not electrically connected, and
wherein the second terminal does not receive the supply of the voltage or the current from the power supply during the period in which the terminal of the external device is not electrically connected.

8. The charging apparatus according to claim 6,
wherein the first threshold value is set to a value between a voltage value when the external device is connected and a voltage value when the external device is not connected.

9. The charging apparatus according to claim 1,
wherein a charging method of the charging apparatus is a charging method conforming to universal serial bus (USB) Type-C.

10. The charging apparatus according to claim 9,
wherein the first terminal is at least one of a CC1 terminal and a CC2 terminal, and
wherein the second terminal is at least one of a VBUS terminal, a D+ terminal, a D– terminal, a TX1– terminal, a TX1+ terminal, a TX2– terminal, a TX2+ terminal, an SBU1 terminal, and an SBU2 terminal.

11. The charging apparatus according to claim 1,
wherein the charging apparatus is mounted on a vehicle.

12. The charging apparatus according to claim 1,
wherein the plurality of terminals are arranged in at least one row with an interval between adjacent ones of the plurality of terminals.

13. The charging apparatus according to claim 1,
wherein the plurality of terminals are arranged in two rows with an interval between adjacent ones of the plurality of terminals, and
wherein the first terminal and the second terminal are included in each of the two rows.

14. The charging apparatus according to claim 13,
wherein the processor is configured to determine, for both of the two rows, whether the voltage of the second terminal is equal to or higher than the second threshold value.

15. The charging apparatus according to claim 13,
wherein the processor is configured to, for each of the two rows,
stop the supply of the voltage or the current from the power supply to the first terminal in the case in which the voltage of the second terminal is equal to or higher than the second threshold value, and
maintain the supply of the voltage or current from the power supply to the first terminal in the case in which the voltage of the second terminal is equal to or lower than the second threshold value.

16. The charging apparatus according to claim 1,
wherein the second terminal is connected to a pull-down resistor.

17. The charging apparatus according to claim 1,
wherein the processor is configured to stop the supply of the voltage or the current from the power supply to the first terminal in a case in which, after a given time period from when it is determined that the voltage of the second terminal is equal to or higher than the second threshold value, the processor again determines that the voltage of the second terminal is equal to or higher than the second threshold value.

18. The charging apparatus according to claim 1,
wherein the second terminal comprises two terminals each at one place away from the first terminal, and
wherein the processor is configured to determine whether a voltage of each of the two terminals is equal to higher than the second threshold value.

19. The charging apparatus according to claim 1,
wherein the second terminal comprises two terminals each at one place away from the first terminal, and
wherein the second voltage detector is configured to detect a voltage of only one of the two terminals.

20. A receptacle control method for controlling a receptacle provided in a charging apparatus and comprising a plurality of terminals, the receptacle control method comprising:

supplying a voltage or a current to a first terminal included in the plurality of terminals;

detecting a voltage of the first terminal;

detecting a voltage of a second terminal included in the plurality of terminals, the second terminal being a terminal at one place, two places or three places away from the first terminal; and determining whether the voltage of the second terminal is equal to or higher than a second threshold value during a period in which the voltage of the first terminal is equal to or higher than a first threshold value, and stopping the supply of the voltage or the current to the first terminal in a case in which the voltage of the second terminal is equal to or higher than the second threshold value.

* * * * *